United States Patent [19]

Kaplan

[11] 4,147,258
[45] Apr. 3, 1979

[54] TRANSFER FOR ELONGATED ARTICLES HAVING OPTIONAL ROLLING RESTRAINT

[75] Inventor: Irving L. Kaplan, Pepper Pike, Ohio

[73] Assignee: Carl Krasny & Associates, Inc., Cleveland, Ohio

[21] Appl. No.: 782,622

[22] Filed: Mar. 30, 1977

[51] Int. Cl.$^2$ .............................................. B65G 47/90
[52] U.S. Cl. .................................... 414/680; 198/645; 414/728; 414/745
[58] Field of Search .................... 214/6 DK, 6 F, 1 P, 214/1 R, 130 R, 1 BB, 1 BD; 198/426, 424, 432, 433, 429, 430, 487, 645, 648, 655; 29/726, 157.4, 455 R, 239; 53/162

[56] References Cited

U.S. PATENT DOCUMENTS

| | | | |
|---|---|---|---|
| 3,170,782 | 2/1965 | Koenig | 214/1 PB X |
| 3,737,021 | 6/1973 | Reth et al. | 198/433 |
| 3,812,951 | 5/1974 | Fullaway | 214/1 P X |
| 3,823,812 | 7/1974 | Sieurin | 214/1 P X |
| 3,880,296 | 4/1975 | Kaplan | 214/6 DK |
| 4,002,248 | 1/1977 | Moller | 214/1 P |

Primary Examiner—Frank E. Werner
Attorney, Agent, or Firm—Maky, Renner, Otto & Boisselle

[57] ABSTRACT

A transfer for elongated articles such as angles, flats, channels or rounds includes an optionally deployable rolling restraint to maintain rounds such as bars or tubes properly on the transfer during operation thereof. More particularly, the transfer is in the form of a relatively thin stacking carriage which elevates to pick up a layer of predetermined width of such articles to transfer the same to the top of a stack being formed. The relatively thin stacking carriage pivots downwardly adjacent the top of the stack and then retracts with adjustable uprights on the stacking cradle causing the layer to be wiped off onto the top of the stack. During such retraction, the top surface of the stacking carriage must be free of obstructions to permit the layer properly to be wiped therefrom. Accordingly, a rolling restraint is provided for the stacking carriage which will move from an ambush position to a position projecting slightly above the top surface of the carriage as it elevates to lift the layer. When elevated, the restraint precludes rolling of articles on the surface of the stacking carriage. As the stacking carriage lowers to deposit the layer on the stack being formed, the restraint automatically retracts to its ambush position completely confined in the profile of the stacking carriage. Movement of the restraint from its extended to its ambush position and vice versa is obtained by oscillating its support shaft 90° as the stacking carriage moves up and down. The drive for the restraint may be disconnected and secured so that the stacking carriage may be operated without operation of the rolling restraint.

23 Claims, 7 Drawing Figures

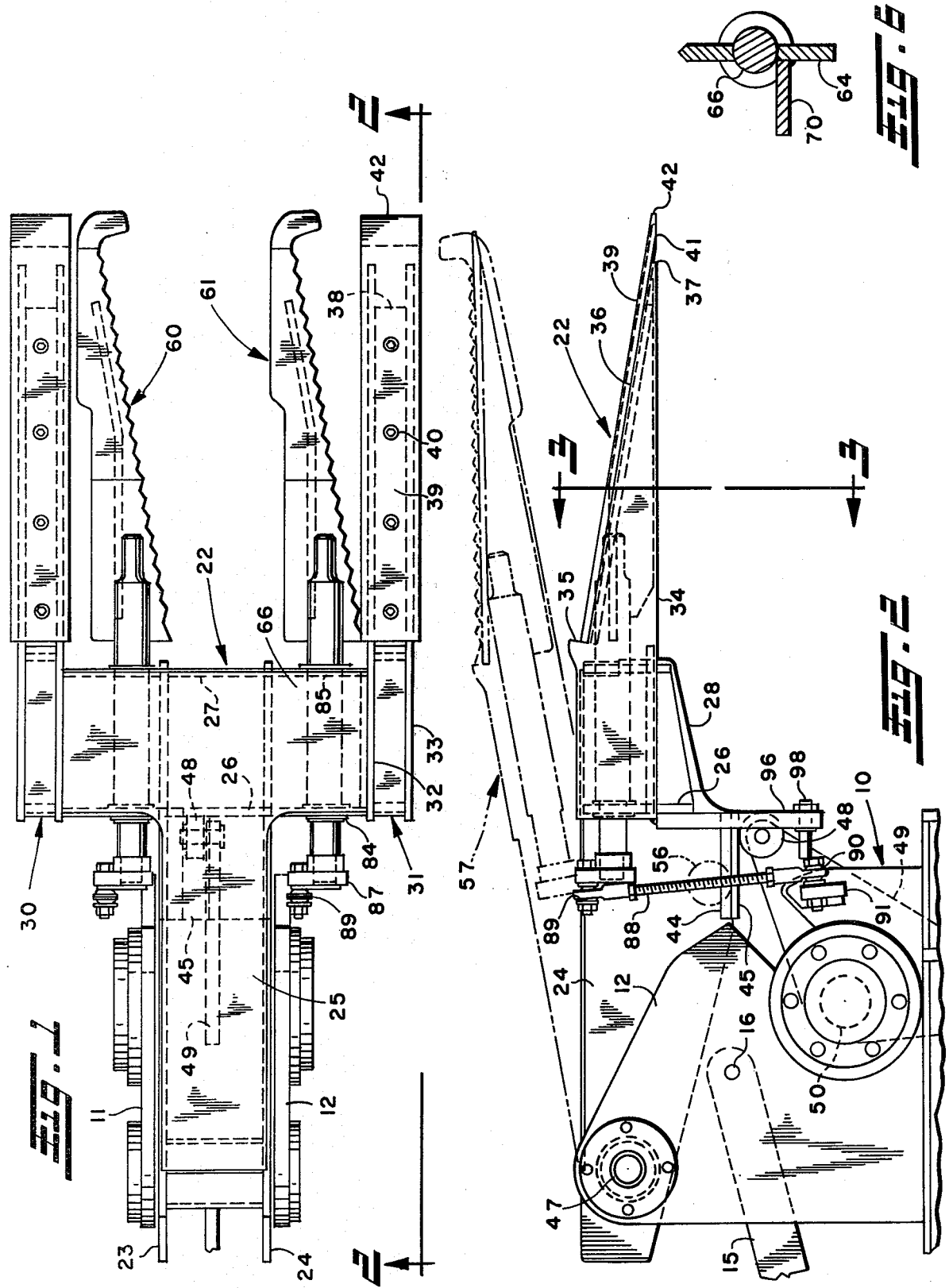

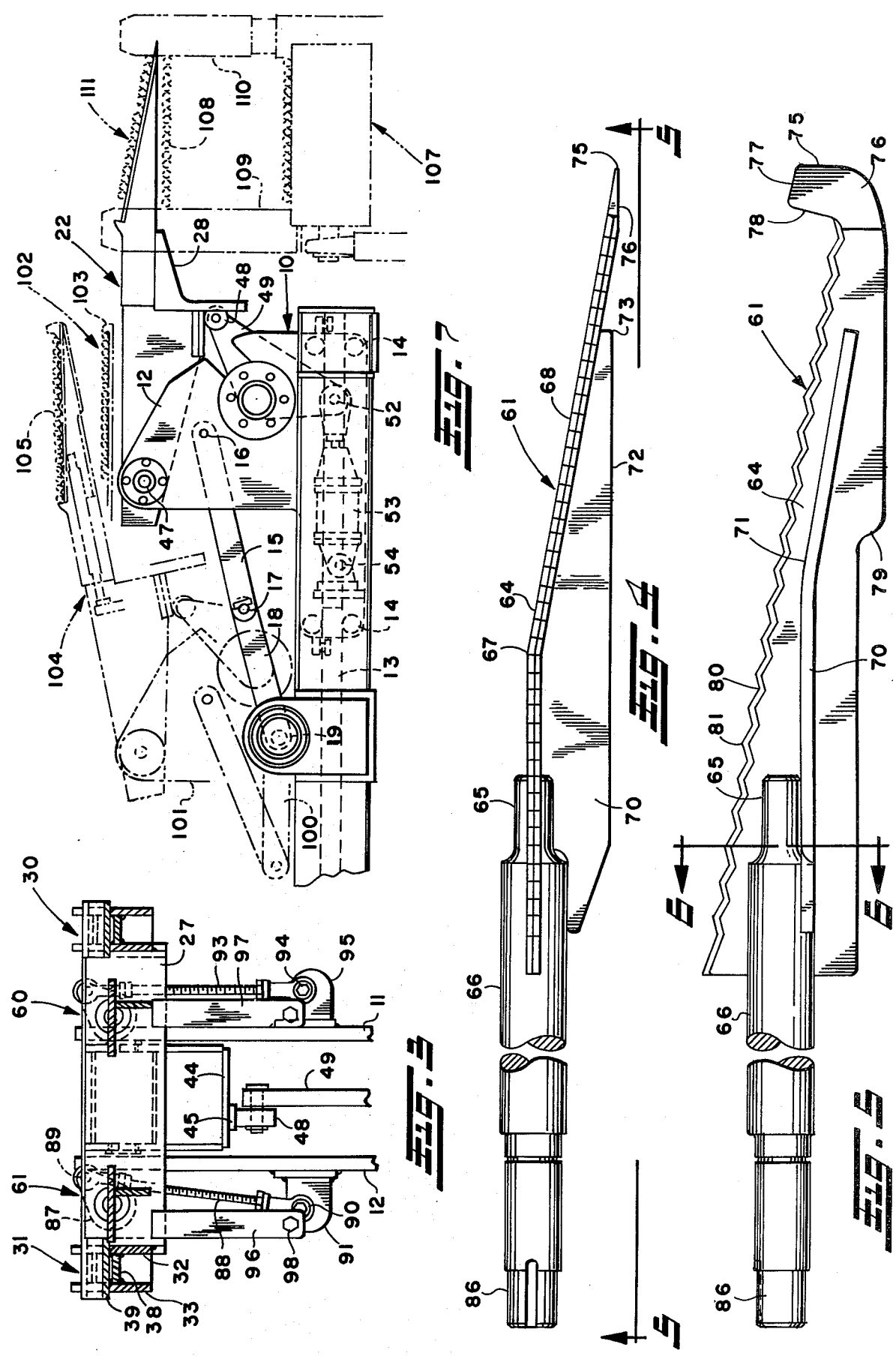

TRANSFER FOR ELONGATED ARTICLES HAVING OPTIONAL ROLLING RESTRAINT

BACKGROUND OF THE INVENTION

This invention relates generally as indicated to a transfer for elongated articles which includes an optionally deployable rolling restraint.

In transfers such as stacking carriages used in automatic stacking machines, different types of transfer carriages are required for elongated articles which will not roll and those which will. For example, one type of stacking carriage may be required for non-rolling articles such as angles, flats, channels, or beams, while another type is required for rounds or tubes which tend to roll. Because of the difficulty in converting from one type of stacking carriage to another, many mills have two completely different stacking and bundling lines for handling articles which will roll and articles which will not. Accordingly, it is highly desirable to provide a transfer such as a stacking carriage with an optionally deployable anti-rolling device which can quickly and easily be employed or not employed depending upon the types of elongated articles being handled. With the improvement of the present invention, complex and expensive transfer and stacking systems for elongated articles are able to handle a much wider variety of such articles.

More particularly, the present invention relates to an improvement in an automatic stacking machine of the type seen in applicant's prior U.S. Pat. No. 3,880,296. With such improvement, which may optionally be deployed, the machine can be used in connection with articles such as angles, flats, channels, or beams, as well as a wide variety of rounds or tubes.

SUMMARY OF THE INVENTION

With the present invention, the stacking carriage or transfer is provided with a rolling restraint which will move from an ambush position to an extended position as the carriage picks up a layer of such articles and moves them to the top of the stack being formed. As the carriage descends, the restraint returns to its ambush position clear both of the layer being transported and the top of the stack therebeneath. The rolling restraint comprises a serrated knife or blade which is mounted on a shaft which oscillates 90°, such oscillation being obtained by a readily disconnectable link connection between the carriage base and the vertically movable portion of the carriage. Such link is connected to an arm on the shaft. The link can readily be disconnected and secured so that the rolling restraint will not be operative during the operation of the stacking carriage.

It is accordingly a principal object of the present invention to provide a transfer for elongated objects having an optionally deployable rolling restraint.

Another principal object is the provision of a stacking carriage such as seen in applicant's U.S. Pat. No. 3,880,296 which can also readily handle elongated articles which will roll.

Another important object is the provision of such transfer or stacking carriage wherein the rolling restraint will move from and return to its ambush position in response to elevation and descent of the transfer or stacking carriage.

Yet another important object is the provision of such rolling restraint which when in its ambush position is fully clear of both the top and bottom of the transfer or carriage.

Still another object is the provision of such transfer which utilizes the normal movement thereof to move the restraint from its ambush to its extended position and vice versa.

A further object is the provision of such rolling restraint which will move in one direction to extend and in the opposite direction to return to its ambush position thus substantially ultimately unaffecting the longitudinal position of such articles.

A yet further object is the provision of such rolling restraint which is of simplified construction and which can readily be disconnected and secured in its ambush position.

These and other objects and advantages of the invention will become apparent as the following description proceeds.

To the accomplishment of the foregoing and related ends, the invention then comprises the features hereinafter fully described and particularly pointed out in the claims, the following description and the annexed drawings setting forth in detail certain illustrative embodiments of the invention, these being indicative, however, of but several of the various ways in which the principles of the invention may be employed.

BRIEF DESCRIPTION OF THE DRAWINGS

In said annexed drawings:

FIG. 1 is a partial top plan view of a transfer or stacking carriage in accordance with the present invention with the rolling restraint shown in ambush position;

FIG. 2 is a side elevation, partially broken away, as taken from the line 2—2 of FIG. 1 showing the transfer or carriage in full lines in its lowermost position and in phantom lines in its elevated position;

FIG. 3 is a vertical section taken substantially on the line 3—3 of FIG. 2;

FIG. 4 is an enlarged plan view of the rolling restraint blade and the shaft on which it is mounted;

FIG. 5 is an elevation of such restraint as seen from the line 5—5 of FIG. 4;

FIG. 6 is a vertical section taken substantially on the line 6—6 of FIG. 5; and

FIG. 7 is a side elevation of a stacking carriage in accordance with the present invention illustrating its extended-down position in full lines and its retracted-up position in phantom lines.

DESCRIPTION OF THE PREFERRED EMBODIMENT

Referring now to the annexed drawings, and more particularly to FIGS. 1, 2, 3 and 7, it will be seen that the transfer or stacking carriage comprises a horizontally movable carriage 10 which comprises parallel, upstanding side plates 11 and 12.

As seen in FIG. 7, the carriage side plates are mounted on rails 13 by means of rollers 14. Horizontal movement of the carriage is obtained by link 15 pivotally connected at 16 to the carriage and at the opposite end at 17 to lever arm 18 secured to oscillating drive shaft 19. As the drive shaft oscillates, the carriage will be moved horizontally back and forth along the rails 13. It will be appreciated that the drive shaft 19 may be common to a number of such stacking carriages as used in an automatic stacking machine such as shown in applicant's aforementioned prior U.S. Pat. No. 3,880,296.

The carriage, in addition to the horizontally movable carriage 10, includes an elevating arm assembly shown generally at 22.

As seen more clearly in FIG. 1, the arm assembly is in the form of a fabricated weldment having the general plan configuration of a tuning fork. The stem of the weldment is formed by two parallel side plates 23 and 24 and a top T-shape plate 25. The head of the T is formed by two parallel spaced plates 26 and 27 extending generally normal to the parallel plates 23 and 24. Such plates 23 and 24 may extend beneath such plates 26 and 27 as seen more clearly at 28 in FIG. 2.

Secured to the outer ends of the head of the T are two spaced parallel arms 30 and 31, each formed of parallel interconnected plates as seen at 32 and 33 in FIGS. 1 and 3. The lower edge of such arm plates is straight or rectilinear as seen at 34 while the top edge forms an abutment 35 and then slopes downwardly at 36 to form a knife edge or point 37. Such plates are interconnected along the sloping surface 36 by a plate 38 and a wear plate 39 is removably secured to the top sloping edges of such side plates 32 and 33 by the fasteners indicated at 40. As seen in FIG. 2, the underside of the wear plate projecting beyond the point 37 is beveled as indicated at 41 to provide a continuation of the straight edge or surface 34, such wear plate then terminating in a knife edge 42. The arm 30 is constructed in the same manner so that the top surface of the wear plates lie in the same plane.

The lowermost portion of the stem forming plates 23 and 24 are connected by plate 44, to the underside of which is secured rail 45. The plate 44 on the bottom and the side plates 23 and 24, together with the top plate 25 form a box frame for the elevating arm assembly adjacent the head of the T.

The stem of the T of the elevating arm frame is pivoted on shaft 47 extending between side plates 11 and 12 of the carriage. The rail 45 on the underside of the box frame portion of the stem is supported on roller 48 on one end of bell crank 49 pivoted on shaft 50. As seen in FIG. 7, the opposite end of the bell crank is connected at 52 to the rod of piston-cylinder assembly 53, the blind end of which is connected at 54 between the side plates 11 and 12 of the carriage. Accordingly, the pivotal position of the elevating arm assembly is controlled by the piston-cylinder assembly 53. When extended, the roller 48 moves to the phantom line position 56 seen in FIG. 2 moving the elevating arm assembly to the phantom line position seen at 57.

It is noted when comparing the full line position seen in FIG. 2 with the phantom line position 57, that the top of the wear plates 39 in the full line position slope downwardly and to the right, but in the elevated phantom line position, slope slightly downwardly and to the left. Thus, in either position, an elongated object of round or circular configuration supported on the wear surface extending normal to the plane of FIG. 2, would tend to roll.

In order to restrain such rolling tendency of the objects being transferred, there is provided a rolling restraint for each arm as indicated at 60 and 61 in FIG. 1. Since such rolling restraints are essentially identical in form, only the rolling restraint 61 will be described in detail. In fact, for the double arm elevating arm assembly illustrated in many instances, only one of the two rolling restraints illustrated need be provided.

Referring now additionally to FIGS. 4, 5 and 6, it will be seen that the rolling restraint 61 includes a blade 64 notched at one end as indicated at 65 and secured as by welding to support shaft 66. As indicated in FIG. 4, the blade is bent at 67 to slope uniformly away from the axis of the shaft 66 as indicated at 68. The slope of the portion 68 of the blade is the same as the slope of the top of the wear plate 39. A stiffening flange 70 is secured to the side of the blade and it too may be bent as indicated at 71. The outside edge 72 of the stiffening flange is parallel to the axis of the shaft 66. The stiffening flange terminates along the side of the blade as indicated at 73.

As seen in FIG. 4, the blade 64 terminates in a knife edge 75 which is formed by beveling or tapering the side of the blade as indicated at 76, again in a plane parallel to the axis of the shaft 66. As seen in FIG. 5, the blade also includes an upturned end portion 77 which includes an inclined stop surface 78. In the full elevated position of the arm and restraint, the stop surface 78 will be no more than vertical. The bottom edge of the blade as seen in FIG. 5 may be offset as indicated at 79 to provide the blade with the necessary depth near the end thereof.

As can be seen in FIGS. 4 and 5, the top or working edge of the blade, which is uniformly sloped toward its end, also on the same slope as the top surface of the wear plate 39, is provided with a series of uniformly spaced V-shape notches as indicated at 80. When the rolling restraint is deployed during the elevation and movement of the transfer, the ridges 81 between such notches will project slightly above the top surface of the wear plates 39. In this manner, the elongated objects supported by the wear plates of the elevating arms will be supported on or restrained by the blades and precluded from rolling movement. The deployed projecting position of the rolling restraint is seen in the phantom line position 57 in FIG. 2.

Referring now to FIGS. 1 and 2, it will be seen that the shaft 66 projects through the plates 26 and 27 and is journalled for oscillation therein at 84 and 85. Keyed to the end 86 of the shaft 66 is a relatively small crank arm 87. An adjustable link or tie rod 88 is connected to the projecting end of the crank arm 87 by the ball joint indicated at 89. The link 88 extends downwardly and is connected by ball joint 90 in similar fashion to link retainer 91 which is secured to the outside of the plate 12 of the carriage. The link 88 is adjustable and provides a rigid connection between the vertically stationary carriage and the elevating arm assembly 22. Therefore, as the arm pivots up and down as seen in FIG. 2, the link 88 will cause the shaft 66 to oscillate approximately 90° moving the restraint from its ambush position seen in FIG. 3 and in full lines in FIG. 2 to its projecting position as seen in phantom lines in FIG. 2.

The restraint 60 is of identical construction, its link 93 being connected at 94 to link retainer 95 secured to the outside of the plate 11. It is noted that the oscillatory movement of the two rolling restraints 60 and 61 is concurrent and in the same clockwise direction from ambush position to projecting position and vice versa as seen in FIG. 3.

Since the elongated objects may be supported by a number of elevating arm assemblies spaced therealong operating in unison, each having one or more of the noted rolling restraints, movement of the rolling restraints concurrently and in the same oscillating direction will maintain the end alignment of such objects. Thus as the rolling restraint blades move to the projecting position, they may elevate and move slightly axially some of the objects. However, when the rolling restraint blades return to the ambush position, they will move such objects back to the original position maintaining the end alignment.

When transferring or stacking elongated objects which are not subject to rolling, it may be desirable to maintain the rolling restraint in its ambush position. To this end, two depending brackets are secured to the plate 27 as seen at 96 and 97 in FIG. 3. The lower end of each bracket is provided with a threaded pivot pin as seen at 98 to which the lower end of each link may be secured. It is a simple task to disconnect the links 88 and 93 from the link retainers 91 and 95, respectively, and connect them to the lower ends of the brackets 96 and 97. When thus connected, the rolling restraints will be immobilized in their ambush position regardless of the position of the elevating arm assembly.

As seen in FIG. 2, it will be appreciated that in the ambush position, the rolling restraint is completely hidden behind the profile of the elevating arm assembly both below the top surface of the wear plate 39 and above the straight bottom edge 34. It will also be appreciated that the configuration of the top edge of the blade of the rolling restraint may vary depending upon the size and type of elongated elements being transferred. Moreover, the blade may include a removable wear surface if desired, the material of which may also vary depending upon the type of elements being transferred. For example, the blade itself or its wear edge may be made of wear resistant plastic material if the elements being transferred might be subject to marring or scratching.

OPERATION

Referring now more particularly to FIG. 7, there is shown an operation of a stacking carriage transfer in accordance with the present invention. With the elevating arm assembly down, the drive shaft 19 rotates counterclockwise as seen in FIG. 7 to move the lever 18 to the position 100 pulling the carriage 10 to the left to the phantom line position 101. In such position, the wear surfaces of the elevating arm assembly will be substantially directly beneath a single layer of elongated objects seen at 102 positioned against stop 103. Such layer may be formed by power driven chain conveyors moving the objects against such fixed stop as described in greater detail in applicant's aforementioned U.S. patent.

When the stacking carriage is retracted and the layer of objects to be transferred has been formed, the piston-cylinder assembly 53 is then extended rotating the bell crank 49 in a counterclockwise direction as seen in FIG. 7 elevating the stacking carriage to the phantom line position seen at 104. The same position is seen at 57 in FIG. 2. As the elevating arm assembly moves upwardly about the pivot 47, the rolling restraint will oscillate 90° from its ambush to its extended position precluding rolling of the objects now elevated as seen at 105. It is noted that in such fully elevated position, the wear surfaces of the elevating arm assembly are inclined slightly to the left as seen in FIG. 7 and without such rolling restraint, the elongated elements would tend to roll toward the left. When the layer of objects has been lifted as seen to the phantom line position 105, the drive shaft 19 is now rotated in a clockwise direction moving the carriage to its full line position shown. When the carriage is thus extended, the piston-cylinder assembly 53 is retracted causing the elevating arm assembly now to pivot downwardly about its pivot 47 to the full line position. As the elevating arm assembly pivots downwardly, the rolling restraints move from their extended position to their full ambush position completely clear of both the top wear plates and the now horizontal underside of the projecting arm assembly.

If the layer of objects is being transferred to a stacking cradle as indicated in phantom lines at 107, the underside of the arm assembly will be positioned just above the top of a layer of objects positioned on the stack by the previous cycle of the machine as indicated at 108. As each layer is deposited in the stacking cradle, the stacking cradle moves downwardly to maintain the top of the stack being formed at the same height with respect to the underside of the elevating arm assembly as shown. The stacking cradle includes vertical side guides or rolls as indicated at 109 and 110 confining the lateral sides of the stack being formed. Such guides or rolls are, of course, offset from the stacking carriage normal to the plane of FIG. 7. When the elevating arm assembly is down, the layer of elongated elements supported thereby will then be between the upper projecting ends of the side guides or rolls and retraction of the carriage by the counterclockwise movement of the shaft 19 will cause the layer of objects seen at 111 to be wiped from the wear plates of the arms by the rollers or guides 109 and to be deposited uniformly on the top of the stack being formed. In such position, the rolling restraint is in its full ambush position clear of both the top and bottom of the elevating arm assembly. The stacking carriage returns to pick up the next layer of objects in the same manner. When the stack has been completed, it may be strapped and removed from the stacking cradle in a direction normal to the plane of FIG. 7. Alternatively, the stack may be compacted before strapping as seen in applicant's copending application Ser. No. 782,494, filed Mar. 29, 1977 entitled "Bundle Compactor".

It can now be seen that there is provided a transfer or stacking carriage for elongated objects having an optionally deployable rolling restraint, such restraint moving from and returning to its ambush position in response to elevation or descent of the transfer or stacking carriage. When in its ambush position, the restraint is fully clear of both the top and bottom of the transfer or carriage. Moreover, the restraint can readily be disconnected and secured in its ambush position. In this manner, the transfer or stacking carriage can handle a wide variety of products.

I therefore, particularly point out and distinctly claim as my invention:

1. A transfer apparatus for elongated articles comprising a carriage having a pivotally mounted arm platform thereon, means to reciprocate said carriage from an article pickup to an article deposit location, means to pivot said arm platform upwardly at said pickup location to elevate and support such elongated articles thereon, and means to pivot said arm platform downwardly at such deposit location to deposit such articles at such deposit location, a rolling restraint for such articles mounted on said transfer apparatus, and means responsive to the pivoting of said arm platform to cause said restraint to project above and retract below said arm platform.

2. A transfer apparatus as set forth in claim 1 wherein said restraint comprises a blade laying on its side when retracted and upright when extended.

3. A transfer apparatus as set forth in claim 2 wherein said blade has an irregular upper edge when extended.

4. A transfer apparatus as set forth in claim 1 wherein said restraint comprises a blade mounted on a shaft journalled in said arm platform.

5. A transfer apparatus as set forth in claim 4 including means responsive to the pivoting of said arm platform to oscillate said shaft and thus said blade to and from its projecting and retracted position.

6. A transfer apparatus as set forth in claim 1 wherein the top of said arm platform includes an inclined wear plate at its outer end, the underside of said arm platform being straight and horizontal in the lowermost position of said arm platform to provide a thin profile for the arm platform terminating in a thin edge at the end of said wear plate, said rolling restraint in its retracted position being completely within the profile of said arm platform.

7. A transfer apparatus as set forth in claim 6 wherein said restraint comprises a shaft, and a blade projecting axially from said shaft, the axis of said shaft being parallel to the underside of said arm platform.

8. A transfer apparatus for elongated articles comprising a transfer platform adapted to be moved from one location to another thus to transfer such elongated articles, means to move said platform downwardly at said another location to deposit the articles thereon at said another location, a rolling restraint mounted on said platform operative to engage such articles to preclude rolling of such articles on such platform during transfer, and means to retract said restraint downwardly clear of the top of said platform in response to the movement of said platform downwardly at said another location.

9. A transfer apparatus as set forth in claim 8 including means to extend said restraint above the top of said platform in response to movement of said platform upwardly at said one location.

10. A transfer apparatus as set forth in claim 9 wherein said means to retract and extend said restraint comprises a drive link, one end connected to said restraint and the other being fixed with respect to said platform.

11. A transfer apparatus for a plurality of elongated articles comprising a transfer platform, means for elevating said transfer platform to pick up such articles and for moving them to a different location, a rolling restraint for such articles mounted on said transfer platform, and means operative to elevate said restraint above said platform from below said platform to engage such articles as said platform is elevated.

12. A transfer apparatus as set forth in claim 11 including drive means for said restraint operative to elevate and retract the same in response to vertical movement of said platform.

13. A transfer apparatus as set forth in claim 12 including a shaft supporting said restraint, said drive means oscillating said shaft in response to vertical movement of said platform.

14. A transfer apparatus as set forth in claim 13 including a crank on said shaft, and a drive link connected to said crank.

15. A transfer apparatus for elongated articles comprising a carriage having a pivotally mounted arm platform thereon, means to reciprocate said carriage from an article pickup to an article deposit location, means to pivot said arm platform upwardly at said pickup location to elevate and support such elongated articles thereon, means to pivot said arm platform downwardly at such deposit location to deposit such articles at such deposit location, a rolling restraint for such articles, means responsive to the pivoting of said arm platform to cause said restraint to project above and retract below said arm platform, said restraint including a blade mounted on a shaft journaled in said arm platform, means responsive to the pivoting of said arm platform to oscillate said shaft and thus said blade to and from its projecting and retracted position, and a drive link fixed at one end to a non-pivoting part of said carriage and connected to said shaft at the other end to cause said shaft to oscillate as said arm platform pivots.

16. A transfer apparatus as set forth in claim 15 including means to secure said drive link at said one end to a portion of said arm platform so that said shaft will not oscillate as said arm platform pivots.

17. A transfer apparatus as set forth in claim 16 wherein said portion of said arm platform comprises a depending bracket thereon, and means optionally to secure said one end of said drive link to the bottom thereof.

18. A transfer apparatus for elongated articles comprising a carriage having a pivotally mounted arm platform thereon, means to reciprocate said carriage from an article pickup to an article deposit location, means to pivot said arm platform upwardly at said pickup location to elevate and support such elongated articles thereon, means to pivot said arm platform downwardly at such deposit location to deposit such articles at such deposit location, a rolling restraint for such articles, and means responsive to the pivoting of said arm platform to cause said restraint to project above and retract below said arm platform, the top of said arm platform including an inclined wear plate at its outer end, the underside of said arm platform being straight and horizontal in the lowermost position of said arm platform to provide a thin profile for the arm platform terminating in a thin edge at the end of said wear plate, said rolling restraint in its retracted position being completely within the profile of said arm platform, said restraint including a shaft, and a blade projecting axially from said shaft, the axis of said shaft being parallel to the underside of said arm platform, said blade being bent along a line normal to the axis of said shaft at an angle corresponding to the angle of said inclined wear plate.

19. A transfer apparatus as set forth in claim 18 wherein said blade is provided with an irregular edge at an angle to the axis of said shaft corresponding to the angle of said inclined wear plate.

20. A transfer apparatus as set forth in claim 19 wherein said irregular edge includes a series of regular projections, each projecting uniformly above said wear plate in the projecting position of said restraint.

21. A transfer apparatus as set forth in claim 18 including a stiffening flange secured to the side of said blade and having an outer edge parallel to the axis of said shaft.

22. A transfer apparatus for elongated articles comprising a transfer platform adapted to be moved from one location to another thus to transfer such elongated articles, means to move said platform downwardly at said another location to deposit the articles thereon at said another location, a rolling restraint on said platform operative to engage such articles to preclude rolling of such articles on such platform during transfer, means to retract said restraint clear of the top of said platform in response to the movement of said platform downwardly at said another location, means to extend said restraint above the top of said platform in response to movement of said platform upwardly at said one location, said means to retract and extend said restraint including a drive link, one end connected to said restraint and the other being fixed with respect to said platform, and means optionally to secure the other end of said drive link to said platform to immobilize said restraint.

23. A transfer apparatus for elongated articles comprising a transfer platform adapted to be elevated to pick up such articles to move them to a different location, a rolling restraint for such articles operative to be elevated above said platform to engage such articles as said platform is elevated, drive means for said restraint operative to elevate and retract the same in response to vertical movement of said platform, a shaft supporting said restraint, said drive means oscillating said shaft in response to vertical movement of said platform, a crank on said shaft, a drive link connected to said crank, and means to fix said drive link to said platform or with respect to said platform to immobilize or operate said restraint, respectively.

* * * * *